(12) United States Patent
Abe et al.

(10) Patent No.: US 9,464,809 B2
(45) Date of Patent: Oct. 11, 2016

(54) GAS TURBINE COMBUSTOR AND OPERATING METHOD FOR GAS TURBINE COMBUSTOR

(71) Applicant: Mitsubishi Hitachi Power Systems, Ltd., Nishi-ku, Yokohama, Kanagawa (JP)

(72) Inventors: Kazuki Abe, Tokai (JP); Tomomi Koganezawa, Tokai (JP); Takeo Saito, Hitachinaka (JP); Keisuke Miura, Mito (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 481 days.

(21) Appl. No.: 13/933,227

(22) Filed: Jul. 2, 2013

(65) Prior Publication Data
US 2014/0007582 A1  Jan. 9, 2014

(30) Foreign Application Priority Data
Jul. 6, 2012  (JP) ................................ 2012-152001

(51) Int. Cl.
*F23R 3/28* (2006.01)
*F02C 7/22* (2006.01)
*F02C 7/26* (2006.01)
(Continued)

(52) U.S. Cl.
CPC ................. *F23R 3/286* (2013.01); *F02C 7/22* (2013.01); *F02C 7/26* (2013.01); *F23D 14/24* (2013.01); *F23R 3/12* (2013.01); *F23R 3/16* (2013.01);
(Continued)

(58) Field of Classification Search
CPC ............ F23R 3/286; F23R 3/12; F23R 3/16; F23R 3/346; F23R 3/28; F23R 3/48; F23R 3/60; F02C 7/22; F02C 7/26; F02C 7/20; F23D 14/24; F23N 2027/02
See application file for complete search history.

(56) References Cited

U.S. PATENT DOCUMENTS 2,818,704 A * 1/1958 Karcher .................... F02C 7/26
60/39.37
6,834,491 B2 * 12/2004 Coppola ................... F23R 3/60
60/39.37
(Continued)

FOREIGN PATENT DOCUMENTS

EP  2 423 601 A1  2/2012
JP  7-55149 A  3/1995
(Continued)

OTHER PUBLICATIONS

Japanese Office Action issued in counterpart Japanese Application No. 2012-152001 dated Jan. 5, 2016 (three pages).

*Primary Examiner* — Carlos A Rivera
(74) *Attorney, Agent, or Firm* — Crowell & Moring LLP

(57) ABSTRACT

Disclosed is a gas turbine combustor equipped with a burner constructed to fire a plurality of combustors at the same time at a fuel/air ratio suitable for gas turbine ignition. A plurality of supports mounted for fixing an air injection hole plate to the combustor are provided at substantially the same phase position as that of cross fire tubes, and combustion air allocations are adjusted. Thus, flame propagation during gas turbine ignition is accelerated and all combustor cans are fired. In addition, porous plates are disposed downstream of the supports and the combustion air allocations are readjusted. Furthermore, air injection holes proximate to the cross fire tubes are particularly reduced in diameter to further adjust the combustion air allocations.

6 Claims, 9 Drawing Sheets

(51) Int. Cl.
*F23R 3/12* (2006.01)
*F23R 3/16* (2006.01)
*F23R 3/48* (2006.01)
*F23R 3/34* (2006.01)
*F23D 14/24* (2006.01)

(52) U.S. Cl.
CPC ............... *F23R 3/28* (2013.01); *F23R 3/346* (2013.01); *F23R 3/48* (2013.01); *F23N 2027/02* (2013.01)

(56) References Cited

U.S. PATENT DOCUMENTS

| | | | |
|---|---|---|---|
| 6,848,260 B2 * | 2/2005 | North | F23R 3/343 60/737 |
| 7,762,074 B2 * | 7/2010 | Bland | F23R 3/04 60/752 |
| 8,197,249 B1 | 6/2012 | Nguyen | |
| 8,397,514 B2 * | 3/2013 | Crawley | F23R 3/02 60/752 |
| 8,919,127 B2 * | 12/2014 | Melton | F23R 3/286 415/115 |
| 9,033,699 B2 * | 5/2015 | Stoia | F23R 3/286 431/144 |
| 2002/0083711 A1 * | 7/2002 | Dean | F23R 3/04 60/737 |
| 2004/0011054 A1 | 1/2004 | Inoue et al. | |
| 2006/0042264 A1 * | 3/2006 | Inoue | F02C 7/22 60/776 |
| 2012/0047897 A1 | 3/2012 | Hirata et al. | |
| 2013/0084534 A1 * | 4/2013 | Melton | F23R 3/10 431/2 |

FOREIGN PATENT DOCUMENTS

| | | |
|---|---|---|
| JP | 2002-257342 A | 9/2002 |
| JP | 2005-30667 A | 2/2005 |
| JP | 3960166 B2 | 8/2007 |
| JP | 2008-175098 A | 7/2008 |
| JP | 2009-52795 A | 3/2009 |
| JP | 2012-47408 A | 3/2012 |
| JP | 2012-52790 A | 3/2012 |

* cited by examiner

Cross section taken along A-A'

Cross section taken along A-A'

Cross section taken along A-A'

GAS TURBINE COMBUSTOR AND OPERATING METHOD FOR GAS TURBINE COMBUSTOR

BACKGROUND OF THE INVENTION

1. Field of the Invention

The present invention relates to a gas turbine combustor and a method for operating the same.

2. Description of the Related Art

As the regulations and social needs relating to environmental protection are being increasingly tightened nowadays, gas turbines are also required to be even more highly efficient and to achieve low NOx emissions.

One effective way to enhance the efficiency of a gas turbine is to raise the gas temperature at the entrance of the turbine. In this case, however, an increase in NOx emission level is liable to result from an increase in internal flame temperature of the gas turbine combustor.

There exist gas turbine combustors that employ a premixed combustion scheme in which a premixture of fuel and air is supplied to and burned in the gas turbine combustor for reduced NOx emissions.

Such a gas turbine combustor that employs premixed combustion includes a premixer and a combustion chamber. The premixer is a constituent element of a burner and premises fuel and air. The combustion chamber is positioned downstream of the premixer to burn the premixed fuel and air.

Premixed combustion creates a uniform flame temperature and thus is effective for seducing NOx emissions. An increase in flame temperature, however, increases the likelihood of flashback, an event that the flame unexpectedly flows back from the combustion chamber of the gas turbine combustor to the premixer which forms part of the burner positioned, upstream of the combustion chamber. For this reason, there is a growing need for a gas turbine combustor having a capability to suppress NOx emissions and an anti-flashback property.

Japanese Patent No. 3960166 discloses a technique concerning a gas turbine combustor having an NOx emissions suppression capability and an anti-flashback property. In the gas turbine combustor pertaining to the technique described in Japanese Patent No. 3960166, a plurality of fueling nozzles and a plurality of air injection holes are coaxially arranged and a plurality of coaxial jet flows of fuel and air are supplied to a combustion chamber and burned therein.

Compared with a conventional gas turbine combustor based on prefixed combustion, the gas turbine combustor, disclosed in Japanese Patent No. 3960166, that supplies the plurality of coaxial jet flows of fuel and air to the combustion chamber and burns the coaxial jet flows therein, can rapidly mix the fuel and the air at a very short distance and in this context, has both an NOx emissions suppression, capability and an anti-flashback property. In addition, since the conventional gas turbine combustor of interest has high anti-flashback performance, the gas turbine combustor is also applicable to fuels high in combustion rate as well as in hydrogen content, such as the coal gasification product gases and coke oven gases adopted in conventional diffuse combustion schemes.

Japanese Patent No. 3960166 also discloses a structure in which fueling nozzles and air injection holes are arranged in a plurality of rows concentrically from the burner center so as to form the plurality of coaxial jet flows of fuel and air.

In a gas turbine with a plurality of combustors, on the other hand, a sparking plug is mounted on two combustor cans present at diagonal positions, for example, and when the gas turbine combustors are ignited, the sparking plugs are fired to cause spark ignition of the combustors. The adjacent combustors are connected to each other via tubes called cross fixe tubes, through which combustion gases from the ignited combustors propagate through the cross fire tubes to the adjacent combustors, thereby igniting all combustors. In this way, the plurality of combustors can be ignited efficiently. JP-2009-52795-A discloses a multi-burner structure including a plurality of burners that form one combustor, in the multi-burner structure of which, a phase in gap between the burners is matched to a phase of cross fire tubes in order to efficiently supply combustion gases to the cross fire tubes during ignition.

SUMMARY OF THE INVENTION

When a sparking plug is used to spark-ignite a combustor equipped with a plurality of burners, it is common to ignite the combustor by supplying a fuel to a highly combustion-stable burner and a burner disposed at a region near a cross fire tube, not by supplying a fuel to ail burners. Such an igniting method is hereinafter called partial firing. One advantage of partial firing over the method of igniting the combustor by supplying fuel to all burners is that because of ignition at a low fuel/air ratio, a thermal shook applied to the burner structure during the ignition of the gas turbine can be alleviated for suppressed sudden increases in liner metal temperature and turbine metal temperature.

However, in the gas turbine combustor structure of Japanese Patent No. 3960166 that supplies the plurality of coaxial jet flows of fuel and air from the concentrically arranged fueling nobles and air injection holes to the combustion chamber and burns the coaxial jet flows therein, firing a plurality of combustors by means of cross fire tubes during the ignition of the gas turbine is considered to involve supplying the fuel to all burners to ensure reliable propagation of combustion gases to the cross fire tubes. If the fuel is supplied to all burners for combustion, however, an increase in fuel/air ratio increases the thermal shock upon the burner structure during the ignition of the gas turbine, as discussed above, and is therefore likely to lead to sudden increases in liner metal temperature and turbine metal temperature.

In the above combustor structure, a flame-propagating burner for accelerated flame propagation may be installed near the cross fire tubes, as a method of flame propagation. With the flame-propagating burner, combustion gases that have occurred in the burner center can be effectively conducted into the cross fire tubes and thus the plurality of combustors can be fired. At the same time, however, the addition of the flame-propagating burner increases the number of burners per combustor can, resulting in both fuel flow control and fuel supply line switching control being complicated.

An object of the present invention is to provide a gas turbine combustor equipped with a burner constructed to ignite a plurality of combustors at a fuel/air ratio suitable for gas turbine ignition.

A gas turbine combustor includes: a combustion chamber that burns a fuel and air to generate combustion gases; a fuel header with a plurality of fueling nozzles disposed thereupon to inject the fuel; an air injection hole plate with a plurality of air injection holes formed therein to deliver to the combustion chamber the air along with the fuel injected from the fueling nozzles; cross fire tubes that each transport the combustion gases to an adjacent combustor and ignite the adjacent combustor during gas turbine ignition; and supports for fixing the air injection hole plate to the fuel header. The supports are provided so as to be of the same phase as that of the cross fire tubes.

The gas turbine combustor equipped with the burner constructed to ignite the plurality of combustors at a fuel/air ratio suitable for gas turbine ignition is provided in accordance with the present invention.

DESCRIPTION OF THE PREFERRED EMBODIMENTS

A first embodiment of the present invention that will be described hereunder is a gas turbine combustor including: a plurality of burners that each mix a fuel and air, then inject the mixture into a combustion chamber, and burn the mixture; a fuel header with a plurality of fueling nozzles arranged thereupon to inject the fuel; an air injection hole plate with a plurality of air injection holes formed therein to deliver the air along with the injected fuel to the combustion chamber; a member that uses the arranged fueling nozzles and air injection holes to form a plurality of coaxial jet flows of the fuel and air; cross fire tubes that each transport combustion gases to an adjacent combustor and ignite the adjacent combustor during gas turbine ignition; and supports for fixing the air injection hole plate to the fuel header. The supports are arranged so as to be substantially of the same phase as that of the cross fire tubes.

In addition, at an outer circumferential side of a firing burner that supplies and burns the fuel during gas turbine ignition, a non-firing burner inactivated during gas turbine ignition is disposed and a region of the non-firing burner that is particularly large in air-injection hole pitch is formed to be substantially of the same phase as that of the cross fire tubes.

A second embodiment of the present invention that will be described hereunder is such gas turbine combustor as outlined above; wherein porous plates are placed downstream of the supports so as to extend in a direction parallel to a flow of air for combustion.

A third embodiment of the present invention that will be described hereunder, particularly reduces a diameter of a plurality of air injection holes proximate to the cross fire tubes.

A fourth embodiment of the present invention that will be described hereunder includes porous plates as the supports.

(1) First Embodiment

First, a gas turbine plant equipped with a gas turbine combustor which is a first embodiment of the present invention is described below with reference to FIG. 1.

Figure 1:
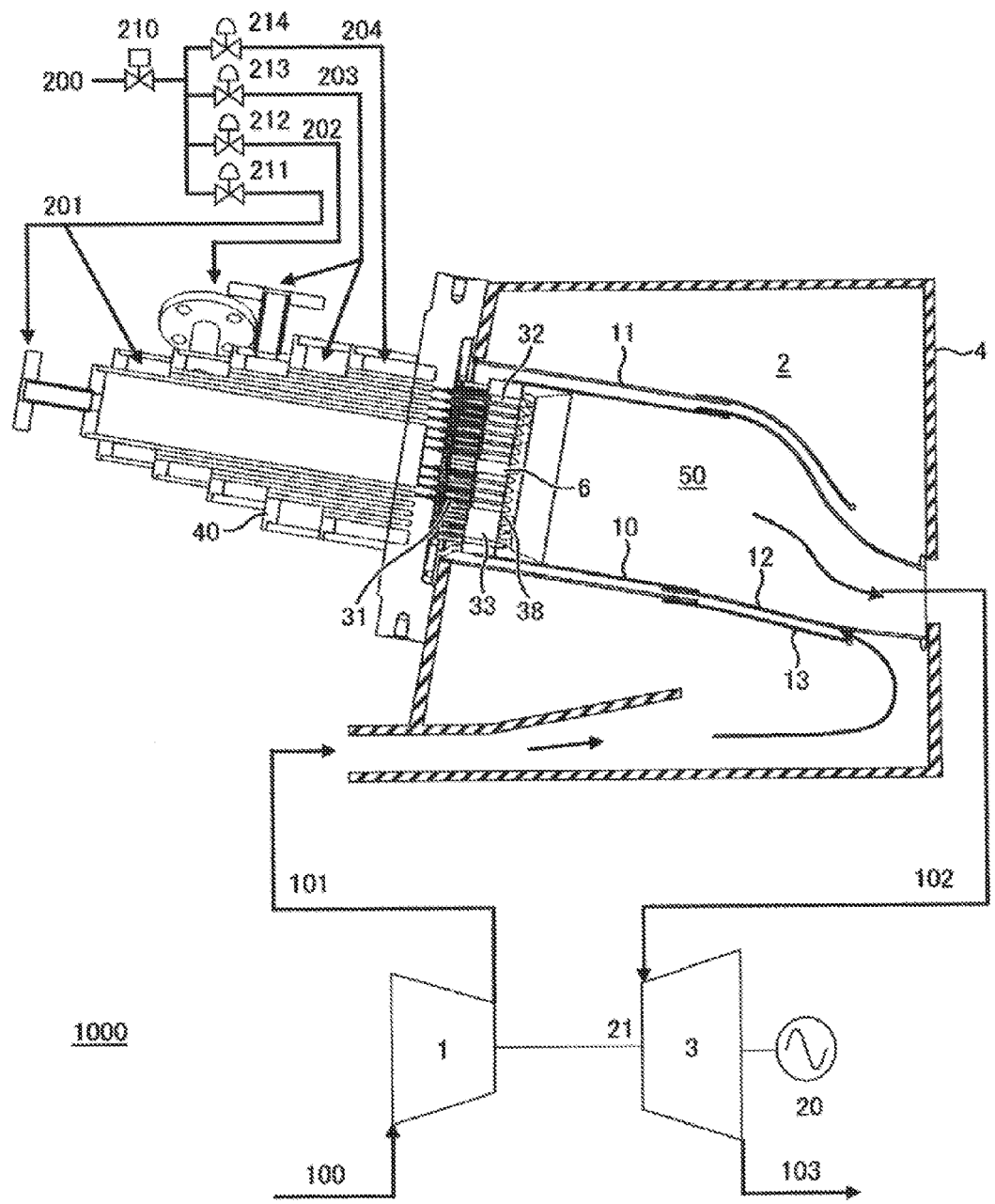
FIG. 1 is a schematic block diagram of a gas turbine plant equipped with a gas turbine combustor which is a first embodiment of the present invention.

FIG. 1 shows an overall configuration of the power-generating gas turbine plant 1000 equipped with the gas turbine combustor 2, which is the first embodiment of the present invention.

The power-generating gas turbine plant 1000 shown in FIG. 1 includes: a compressor 1 that generates high-pressure air 101 by applying a pressure to inlet air 100; a gas turbine combustor 2 that generates high-temperature combustion gases 102 by mixing the high-pressure air 101 that the compressor 1 has generated, with a fuel supplied through a fuel line 200, and burning the mixture; a turbine 3 driven by the high-temperature combustion, gases 102 that the gas turbine combustor 2 has generated; and a power generator 20 rotated by the driving of the turbine 3, to generate electric power.

The compressor 1, the turbine 3, and the generator 20 are interconnected via an integrated shaft 21, and a driving force that has been obtained by the driving of the turbine 3 is transmitted to the compressor 1 and the generator 20 through the shaft 21.

The gas turbine combustor 2 is stored within a casing 4 of the gas turbine apparatus.

A burner 6 is installed in the gas turbine combustor 2, and at a downstream side of the burner 6 inside the gas turbine combustor 2, a substantially cylindrical combustor liner 10 is disposed to separate the high-pressure air 101 supplied from the compressor 1, from the high-temperature combustion gases 102 generated by the gas turbine combustor 2.

Along an outer circumference of the combustor liner 10 is disposed a flow sleeve 11 that serves as an outer wall to form an air flow passage for conducting the high-pressure air 101 downward from the compressor 1 to the gas turbine combustor 2. The flow sleeve 11 is larger than the combustor liner 10 in diameter and has a cylindrical shape substantially concentric with that of the combustor liner 10.

A combustion chamber 50 formed internally to the combustor liner 10 of the gas turbine combustor 2 burns the mixture of the high-pressure air 101 ejected from the burner 6, and the fuel supplied through the fuel line 200. A tail-pipe inner casing 12 for guiding the resulting high-temperature combustion gases 102 to the turbine 3 is also disposed. A tail-pipe outer casing 13 is disposed along an outer circumference of the tail-pipe inner casing 12.

After being compressed by the compressor 1, the inlet air 100 becomes the high-pressure air 101, and this air is then fed into the casing 4 to fill it. After this, the air flows into a space formed between the tail-pipe inner casing 12 and the tail-pipe outer casing 13, and thereby conducts convective cooling of the tail-pipe inner casing 12 from an outer wall thereof.

The high-pressure air 101 that has flown downward through the space between the tail-pipe inner casing 12 and the tail-pipe outer casing 13 is to further flow through an annular flow passage formed between the flow sleeve 11 and the combustor liner 10, and then heads downward for the gas turbine combustor 2. During this downward movement, the high-pressure air is used for the convective cooling of the combustor liner 10 lying inside the gas turbine combustor 2.

In addition, part of the high-pressure air 101 which has flown downward through the annular flow passage formed between the flow sleeve 11 and the combustor liner 10 flows into the combustor liner 10 from a large number of cooling holes provided on a wall surface of the combustor liner 10, and is used for film cooling of the combustor liner 10.

The remaining high-pressure air 101 that has not been used for the film cooling of the combustor liner 10 as a result of the downward movement is fed into the combustor liner 10 from a number of air injection holes 32 provided on the burner 6 equipped in the gas turbine combustor 2.

Four fuel lines for supplying fuel through the fuel line 200 provided with a fuel shutoff valve 210 are disposed for the burner 6 in the gas turbine combustor 2. The four fuel lines are: an F1 fuel line 201 with an F1 fuel flow control valve 211; an F2 fuel line 202 with an F2 fuel flow control valve 212; an F3 fuel line 203 with an F3 fuel flow control valve 213; and an F4 fuel line 204 with an F4 fuel flow control valve 214. The valves 211 to 214 are each branched from the fuel line 200.

A flow rate of an F1 fuel supplied to the burner 6 through the F1 fuel line 201 is controlled by the F1 fuel flow control valve 211, and a flow rate of an F2 fuel supplied to the burner 6 through the F2 fuel line 202 is controlled by the F2 fuel flow control valve 212. Likewise, a flow rate of an F3 fuel supplied to the burner 6 through the F3 fuel line 203 is controlled by the F3 fuel flow control valve 213ƒ and a flow rate of an F4 fuel supplied to the burner 6 through the F4 fuel line 204 is controlled by the F4 fuel flow control valve 214.

The control of the F1 to F4 fuel flow rates by the fuel flow control valves 211 to 214, respectively, controls the amount of electric power that the gas turbine plant 1000 generates.

Next, a detailed configuration of the gas turbine combustor 2 is described below.

Figure 2:
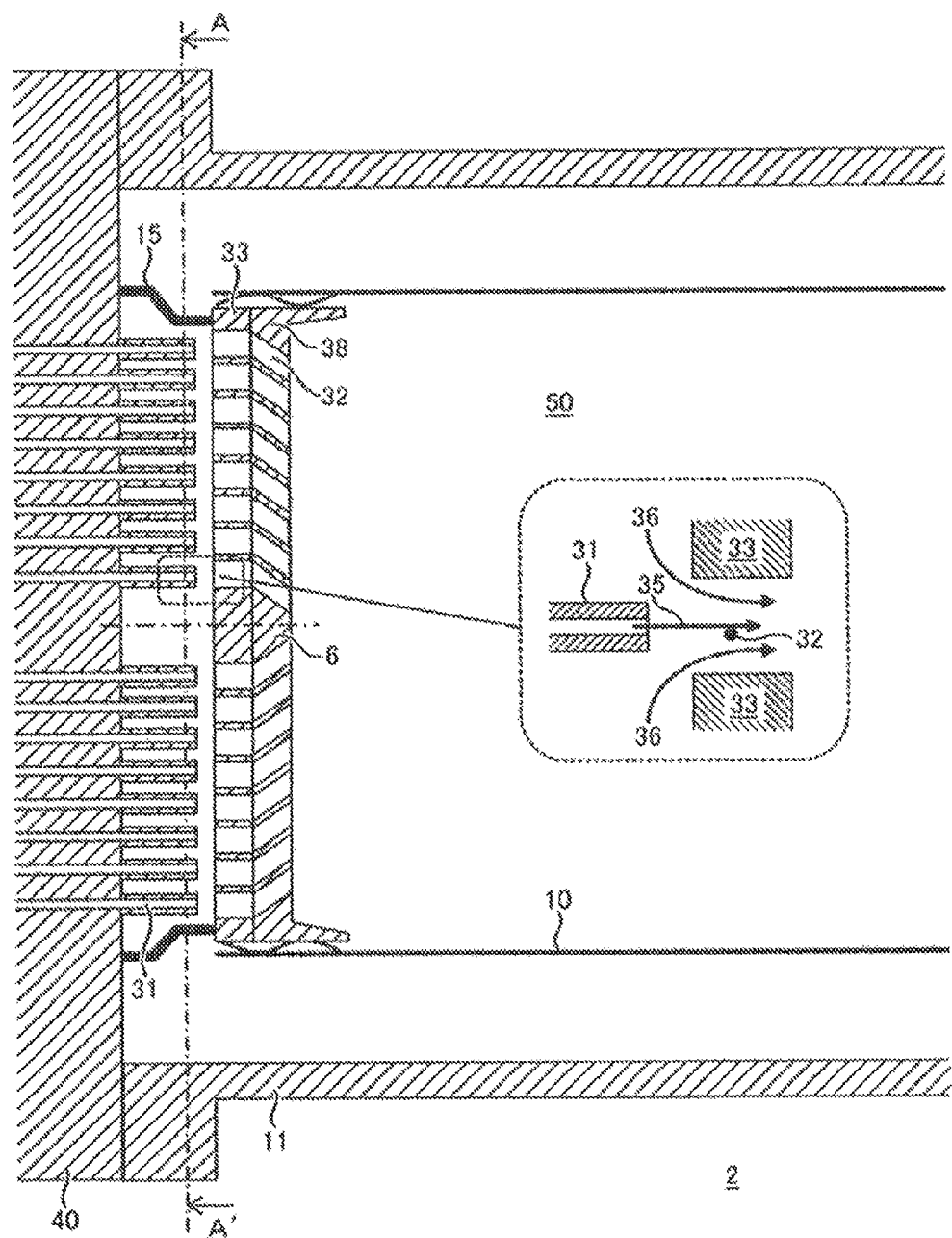
FIG. 2 is a partial structural view that shows details of relative positions of fuel injection holes in fueling nozzles with respect to a base plate and a swirling plate, the fueling nozzles, the base plate, and the swirling place being constituent elements of a burner equipped in the gas turbine combustor of the first embodiment shown in FIG. 1.

FIG. 2 is a partial structural view that shows details of relative positions of fuel injection holes in fueling nozzles with respect to a base plate and a swirling plate, the fueling nozzles, the base plate, and the swirling plate being constituent elements of the burner 6 equipped in the gas turbine combustor 2 of the first embodiment shown in FIG. 1.

The burner 6 installed in the gas turbine combustor 2 of the first embodiment has a structure with a number of fueling nozzles 31 mounted on a fuel header 40 of the gas turbine combustor 2. In the burner structure, the base plate 33 and the swirling plate 38, both having a number of air injection holes 32 each corresponding to one specific fueling nozzle 31 mounted on the fuel header 40, are also mounted on the fuel header 40 via supports 15.

The burner 6 is provided with the base plate 33 in which the plurality of air injection holes 32 are formed, and the swirling plate 38 that is fixed to the base plate 33 and in which the plurality of other air injection holes 32 each assigned a swirling angle are formed. The swirling plate 38 faces the combustion chamber 50 formed infernally to the combustor liner 10.

The air injection holes 32 in the base plate 33 are disposed to communicate with those of the swirling plate 38, and the fueling nozzles 31 and the air injection holes 32 in the base plate 33 are disposed coaxially.

One pair of coaxially disposed fueling nozzles 31 and air injection holes 32 are substantially concentric, and as shown in the detailed structural view of FIG. 2, a coaxial jet flow constituted by a fuel jet flow 35 depicted centrally in the structural view and by air jet flows 36 depicted at both sides of the fuel jet flow 35 are formed in large numbers.

While the fuel and air in the air injection holes 32 formed in the base plate 33 stay in the coaxial jet-flow structure, the fuel and the air are not mixed, which prevents the fuel from spontaneously igniting and hence the base plate 33 and the swirling plate 38 from suffering thermal damage, and thus makes the gas turbine combustor 2 highly reliable.

In addition, since small coaxial, jet flows are formed in great numbers as described above, the number of interfaces between the fuel and the air increases and this accelerates mixing, such that NOx emissions during combustion in the gas turbine combustor 2 are suppressed.

Part of the high-pressure air 101 which has been supplied to the gas turbine combustor 2 through the annular flow passage formed between the flow sleeve 11 and combustor liner 10 of the gas turbine combustor 2 is supplied, in a form of the air let flow 36 shown in FIG. 2, to each air injection hole 32 formed in the base plate 33 which constitutes part of the fueling nozzles of the burner 6. This air next flows downward through the air injection hole 32 in the base plate 33, and after being swirled by the corresponding air injection hole 32 formed in the swirling plate 38 fixed to the base plate 33, the air is supplied to the combustion chamber 50.

Figure 3:
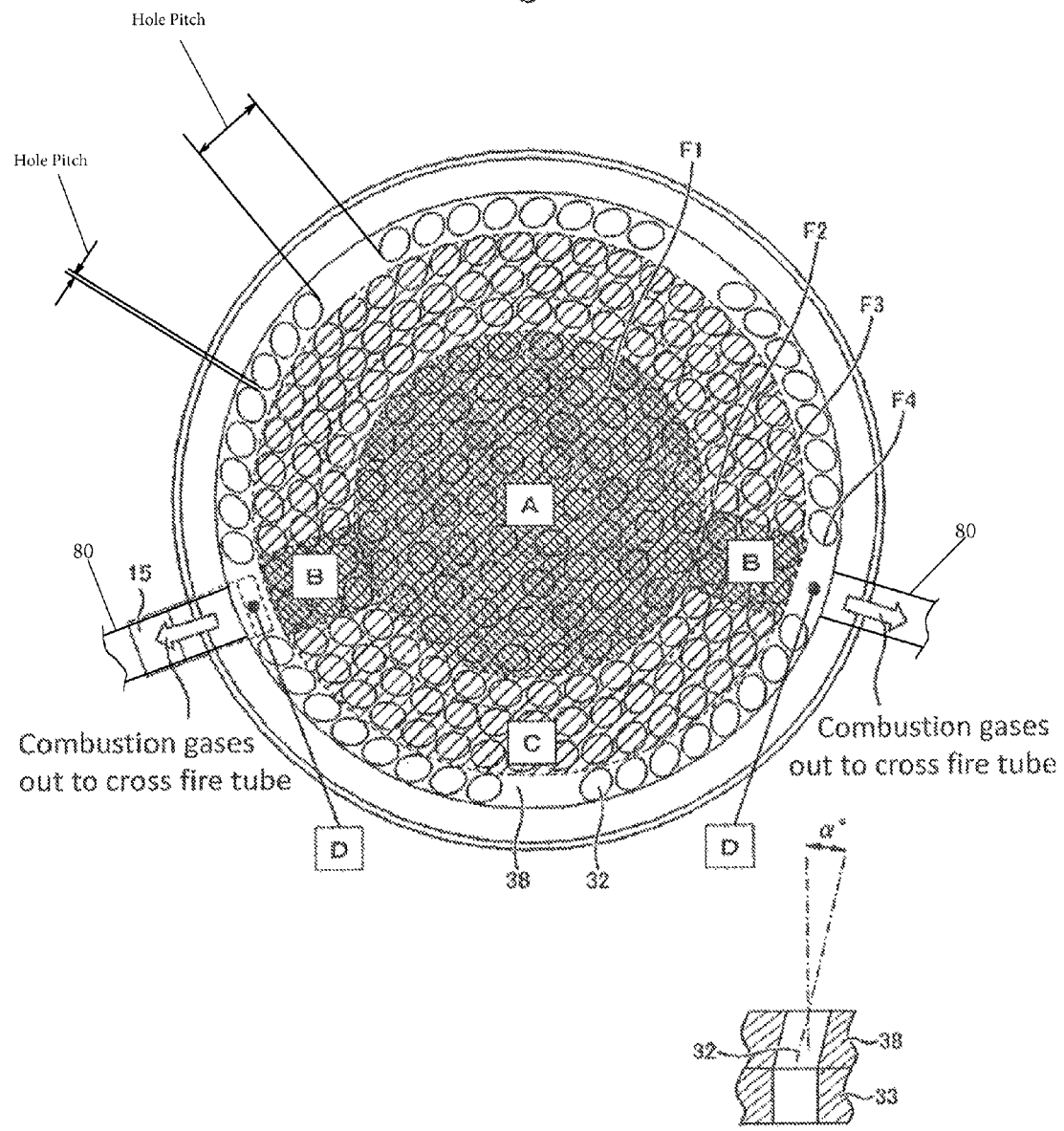
FIG. 3 is an external view of the swirling plate which forms part of the burner equipped in the gas turbine combustor of the first embodiment shown in FIG. 1, the external view showing the swirling plate as viewed from a downstream side thereof.

FIG. 3 is an external view of an air injection hole plate formed from the base plate 33 and swirling plate 38 in the gas turbine combustor 2 of the present embodiment, the external view showing the air injection hole plate as viewed from a downstream side of the combustor 2. In the gas turbine combustor 2 of the present embodiment, the large number of air injection holes 32 (and although not shown, the fueling nozzles 31 paired with the air injection holes 32) are arranged in eight annular rows concentrically from a radial inner edge of the air injection hole plate to a radial outer edge thereof.

The burner that forms combustor sections of the gas turbine combustor 2 is grouped into eight rows. That is to say, four central rows (first to fourth rows) are an F1 burner forming the combustor sections of a first group (F1), a fifth row is an F2 burner forming the combustor sections of a second group (F2), two rows (sixth and seventh rows) external to the fifth row are an F3 burner forming the combustor sections of a third group (F3), and the outermost row (eighth row) is an F4 burner forming the combustor sections of a fourth group (F4). As shown in FIG. 1, the fuels supplied from the fuel lines 201 to 204 provided with the fuel flow control valves 211 to 214, respectively, are supplied to the fueling nozzles 31 independently for each of the F1 to F4 burner groups.

This grouped structure of the fuel lines 201 to 204 enables fuel staging in which the number of fueling nozzles for supplying the fuel, is changed stepwise in response to a change in the flow rate of the fuel in the gas turbine. During partially loaded, operation of the gas turbine, fuel staging ensures combustion stability and reduces NOx.

Additionally, the air injection holes 32 of the base plate 33 are each formed in a straight tube, and the air injection holes 32 in the swirling plate 38 are each formed as an oblique hole having an angle ($\alpha$ degrees in FIG. 3). Thus, the entire downward airflow through the air injection holes 32 is swirled and a consequential circulating flow stabilises the flame. The angle of $\alpha$ degrees is set to be an optimal value in each row.

Compared with the F2 to F4 burners, the F1 burner is widely pitched between individual air injection holes 32, and the flame is attached to these clearances for enhanced flame stability. Conversely the F1 burner, compared with the F2 to F4 burners, are narrowed in hole pitch (see FIG. 3). This prevents the flame from sticking to the clearances between the holes, and implements low-NOx combustion by employing a mixing distance extended to the flame surface. The F2 to F4 burners disposed externally to the F1 burner stabilize the flame by virtue of combustion heat from the central F1 burner, and achieve low-NOx combustion as well.

In the present embodiment, as shown in FIG. 3, a region with a particularly large hole pitch between the air injection holes 32 is partially provided in the fourth group (the eighth row). An upstream side of this region without an air injection hole 32, that is, the reverse side of the drawing is a mounting section for the supports 15 for fixing the base plate 33 to the fuel header 40. As shown in FIG. 2, each support 15 is of a shape obtained by bending a flat plate. This bent structure of the support helps to absorb its peripheral thermal expansion, thus enhancing its structural reliability. In gas turbines each equipped with a plurality of combustors, one cross fire tube 80 is commonly installed on both left and right sides of each combustor so that during ignition of the gas turbine, the plurality of gas turbine combustors are sequentially ignited by transporting combustion gases from one combustor that has been ignited by a sparking plug, to an adjacent combustor. The supports 15 have the same phase as that of the installed cross fire tubes. When the air injection holes 32 have a swirling angle, however, matching a phase of the support 15 to that of the cross fire tubes causes a shift between a phase of the widely hole-pitched region and that of the cross fire tubes. In other words, since the cross fire tubes and the widely hole-pitched region differ from each other in axial position, a flow of air corresponding to the widely hole-pitched region is estimated to change in a circumferential direction from the positions of the cross fire tubes. For this reason, the phase of the support 15 is adjusted for matching in phase between the widely hole-pitched region and the cross fire tubes, in consideration of a swirling flow of the air ejected from the air injection holes 32. The following description conveniently assumes that the support 15 exists at the same phase position as that of the cross fire tubes.

Figure 4A:
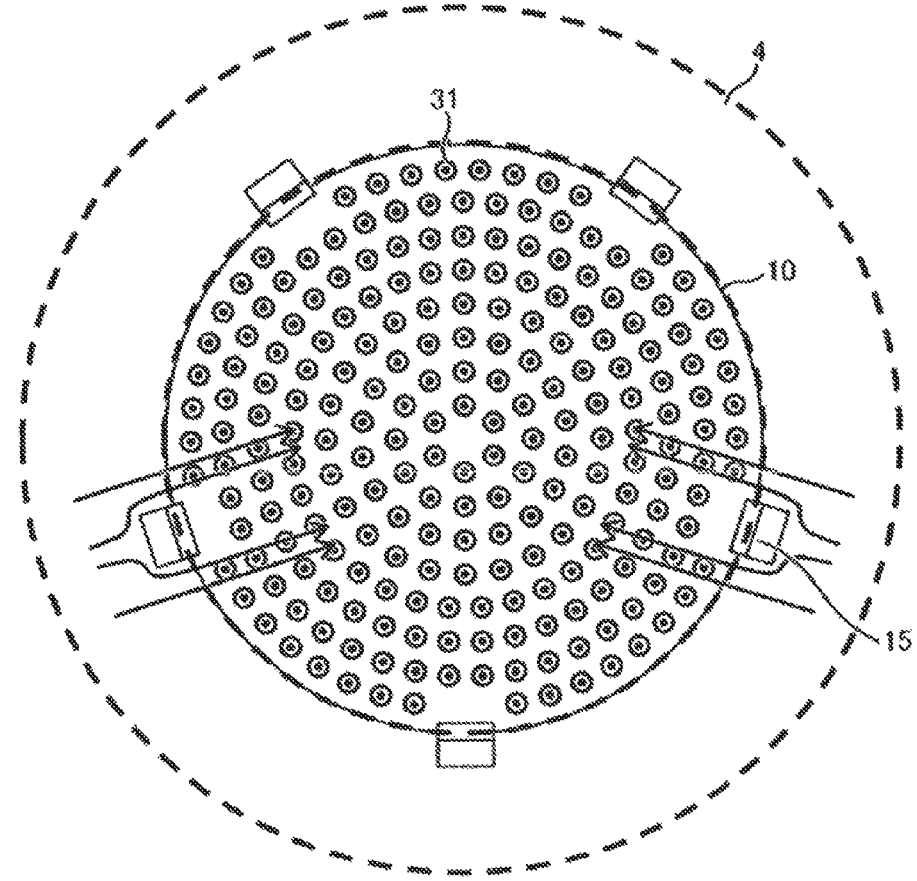
FIG. 4A is a sectional view, taken along section lines A-A' in FIG. 2, of the fueling nozzles which form part of the burner equipped in the gas turbine combustor of the first embodiment.
Figure 4B:
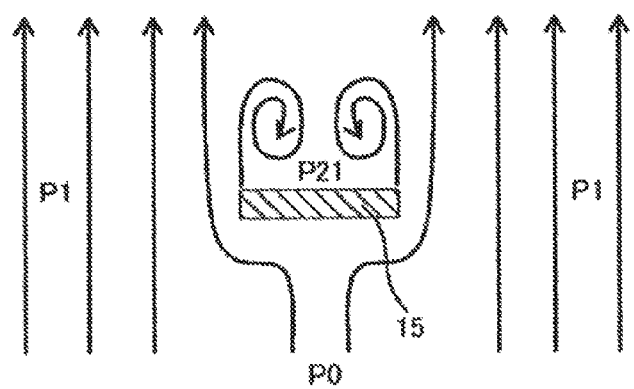
FIG. 4B is an enlarged view of a support which forms part of the burner equipped in the gas turbine combustor of the first embodiment shown in FIG. 2.

The flow of air existing when the supports 15 are used to fix the air injection hole plate to the fuel header 40 is shown in FIGS. 4A and 4B. FIG. 4A is a sectional view taken along line A-A' in FIG. 2, and FIG. 4B is an enlarged view of one support 15. To ensure that the combustion air supplied to the burner 6 becomes uniform in the entire burner for reduced combustor pressure loss, it is common to create a non-disturbed, smooth flow of air, even when a structure such as the support 15 is disposed in the flow. The support 15 in the present embodiment, however, intentionally obstructs the flow of the combustion air flowing from the outer circumferential side of the burner, towards the burner center, as shown. If a pressure occurring at an outer edge of the support 15 at this time is expressed as P0, a pressure likewise occurring at regions without the support 15 is expressed as P1, and a pressure at a burner central side of the support 15 is expressed as P21, then the three pressures have a relationship of P0>P1>P21. The pressure difference of P1>P21 indicates that at a position of P21 as compared with that of P1, the combustion air is difficult to supply to the air injection holes 32. A flow rate of the combustion air decreases at the position of P21, therefore, a flow rate of the fuel becomes constant or the differential pressure increases with decreasing P21. This in turn increases the flow rate of the fuel, thus increasing a fuel/air ratio relative to that obtained in a burner not positioned downstream of the support 15.

To reduce the amount of combustion air by means of the support 15 for improved flame propagation performance, the support 15 desirably has a width greater than an inside diameter of the cross fire tubes.

Ignition timing is described below with reference to FIG. 3 once again. For ignition, fuel is supplied to burner regions A, B, C shown in the figure. At this time, burner region B is greater than burner region C in terms of a mass flow ratio of the fuel and air (i.e., fuel/air ratio). That is to say, during ignition, when a combustion gas of a relatively high temperature occurs in region A, the combustion gas propagates in an outer circumferential direction, along region B high in fuel/air ratio relative to region C. The combustion gas that has propagated in the outer circumferential direction further passes through region D not having an air injection hole, and then flows into the cross fire tubes. Disposing no air injection holes is useful for preventing reduction in flame propagation performance, since combustion air dilutes the combustion gas and lowers the combustion gas temperature.

As described above, the supports 15 and the cross fire tubes need to be matched in phase. In the present embodiment, five supports 15 are disposed in a circumferential direction of the swirling plate 38 since 10 combustor cans, for example, are disposed in a circumferential direction of the gas turbine shaft. When a plurality of supports 15 are arranged at equally spaced phase positions, if the number of supports 15 is taken as Ns and that of combustor cans is taken as Nc, the following expression holds:

$$Ns = n^*(Nc/2) \tag{1}$$

where "n" is an integer of at least 1.

Figure 5A:
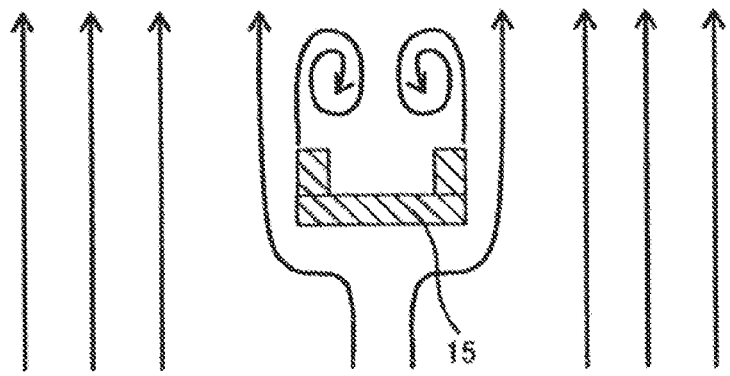
FIG. 5A is a schematic view showing a support of another shape that forms part of the burner equipped in the gas turbine combustor of the first embodiment shown in FIG. 4B.
Figure 5B:
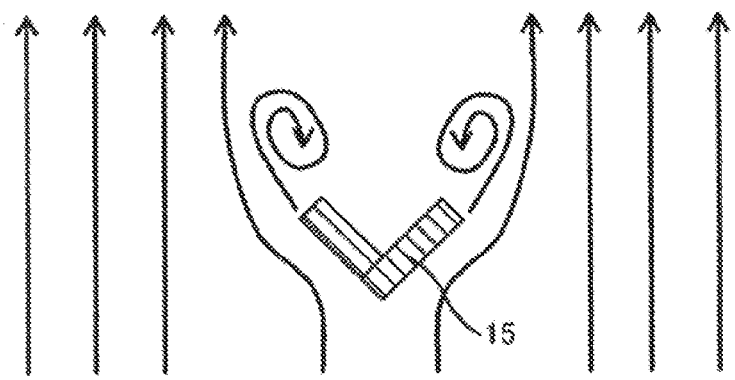
FIG. 5B is a schematic view showing a support of yet another shape that forms part of the burner equipped in the gas turbine combustor of the first embodiment shown in FIG. 4B.
Figure 5C:
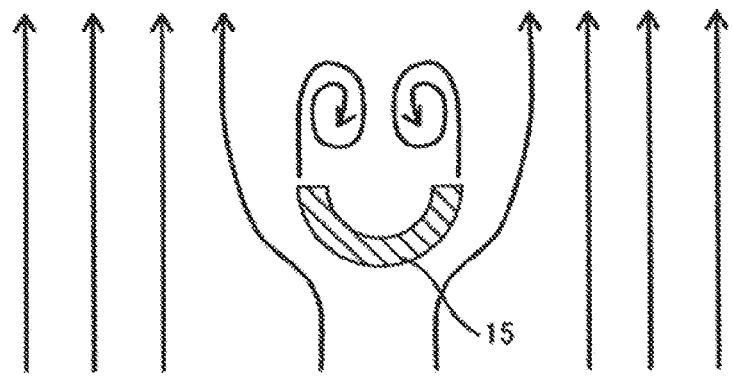
FIG. 5C is a schematic view showing a support of a further shape that forms part of the burner equipped in the gas turbine combustor of the first embodiment shown in FIG. 4B.

While the supports 15 in the present embodiment are of the shape shown in FIGS. 4A, 4B, the supports 15 may instead have a structure shown in any one of FIGS. 5A to 5C.

FIG. 5A shows a support shape ribbed at both ends of the support 15 of FIG. 4B, for increased strength of the support relative to that of the support 15 shown in FIG. 4B. In addition, since the burner central side of the support 15 is surrounded by the ribs, a supply rate of combustion air at a downstream side of the support 15 tends to decrease below that obtained in FIG. 4B. FIG. 5B shows a V-shaped support 15, this shape being effective for reducing fluid loss in comparison with the structure of FIG. 4B, and the support 15 being able to be disposed between air injection holes 32 by adjusting an angle of the V-shape. FIG. 5C shows a support 15 curved at its upstream side, this structure also reducing fluid loss and increasing strength of the support 15, compared with the support structure of FIG. 4B.

Figure 6:
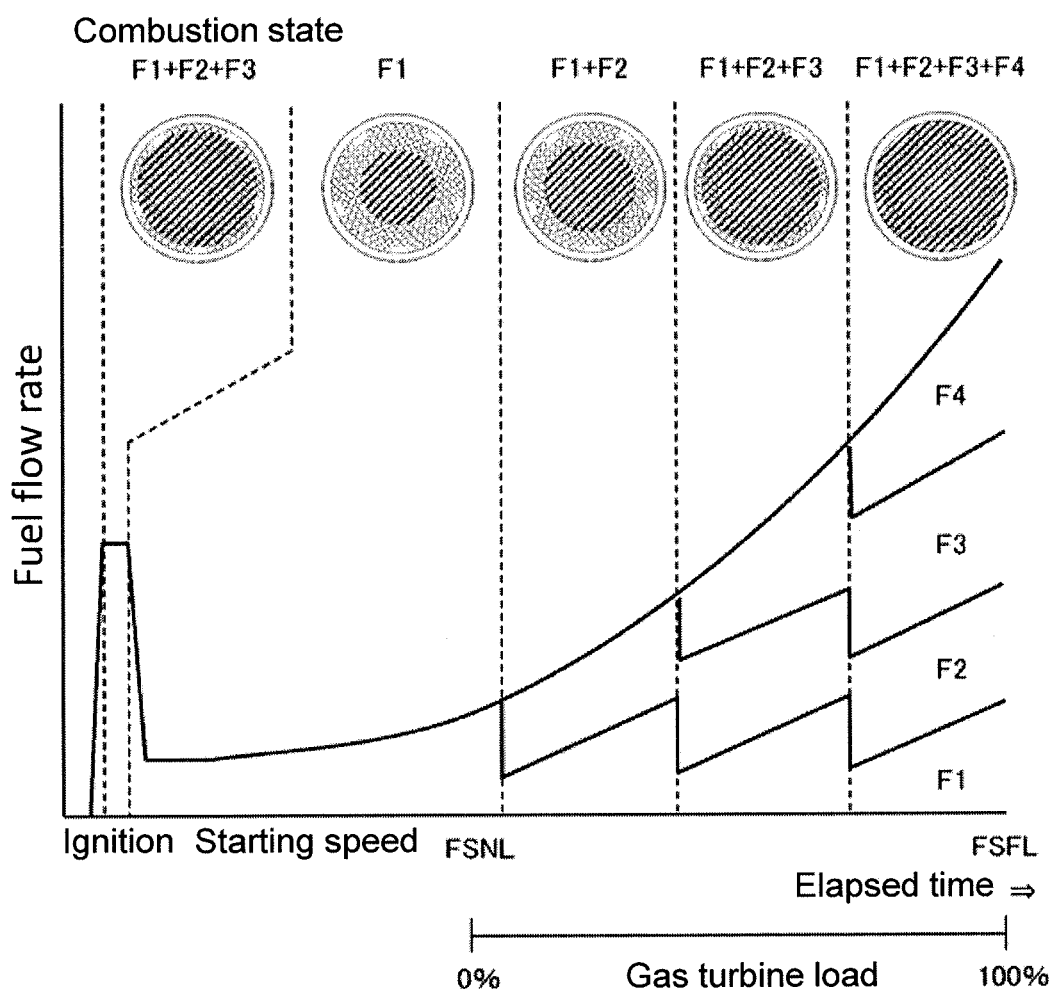
FIG. 6 is a graph of operating parameters relating to the burner equipped in the gas turbine combustor of the first embodiment shown in FIG. 1.

FIG. 6 is a graph of operating parameters relating to the combustor 2 of the gas turbine plant 1000 of the present. Time is plotted on a horizontal axis, and the flow rate of the fuel is plotted on a vertical axis. When the gas turbine is fired, the fuel is supplied to F1 to F3 (the first to seventh rows) and burned therein, ho fuel is supplied to F4 (the eighth row). The combustion, gases that have occurred in F1 to F3 move through the fueling nozzles of F4 and a region not having an air injection hole 32, then flow into the cross fire tubes, and are further transported to a combustor not having a sparking plug. All gas turbine combustor cans are thus fired.

After firing, operation is switched to F1-only independent combustion and the turbine 3 is accelerated to a full-speed no-load (FSHL) state. Following the acceleration to the FSNL state, power generation is started and the load is increased. As the load is being increased, fuel is supplied to sequentially increase the number of fuel supply lines, namely F1, F2, F3, F4, until the burner 6 of the gas turbine combustor 2 has reached a stable combustion range of its fuel/air ratios. The gas turbine combustor 2 of the present embodiment reaches a full-speed full-load (FSFL) state during combustion with the fuel supplied to F1 to F4.

In the gas turbine combustor 2 of the present embodiment, while the fuel is supplied to all of F1 to F4 and combustion is underway, the combustion is taking place in the entire burner 6 and an acceleration loss is therefore occurring at an upstream side of the flame. This acceleration loss cancels out the present embodiment's intended effect of reducing the amount of combustion air in the entire region from the burner center to the region between the cross fixe tubes by means of the supports 15. More specifically, since the acceleration loss of the flame is significant relative to a pressure difference of P0>P21, the combustion air flow redaction effect due to the pressure difference of P0>P21 becomes substantially nil under the state that the fuel is supplied to all of F1 to F4. In the FSFL state, therefore, the amount of combustion air can be uniformly allocated to the entire burner 6, which in turn enables low-NOx combustion equivalent to that of the gas turbine combustor disclosed in Japanese Patent No. 3960166, that is, the combustor in which the sections that form a plurality of coaxial jet flows of fuel and air are arranged concentrically and these jet flows are supplied to the combustion chamber.

In accordance with the present embodiment, therefore, during the ignition of the gas turbine equipped with a plurality of combustor, all combustor cans are ignited at a suitable fuel flow rate, and during full-speed turbine operation, low-NOx combustion and stable combustion are both achieved at the same time.

(2) Second Embodiment

Next, a gas turbine combustor installed in a gas turbine according to a second embodiment of the present invent ion, and a method of operating the combustor are described below with reference to FIGS. 7A and 7B.

The gas turbine combustor installed in the gas turbine of the present embodiment is basically of the same configuration as that of the gas turbine combustor installed in the gas turbine according to the first embodiment of the present invention, shown in FIGS. 1 to 6. Description of configurational and operational factors common to both embodiments is therefore omitted hereinafter and only differences between both are described below.

Figure 7A:
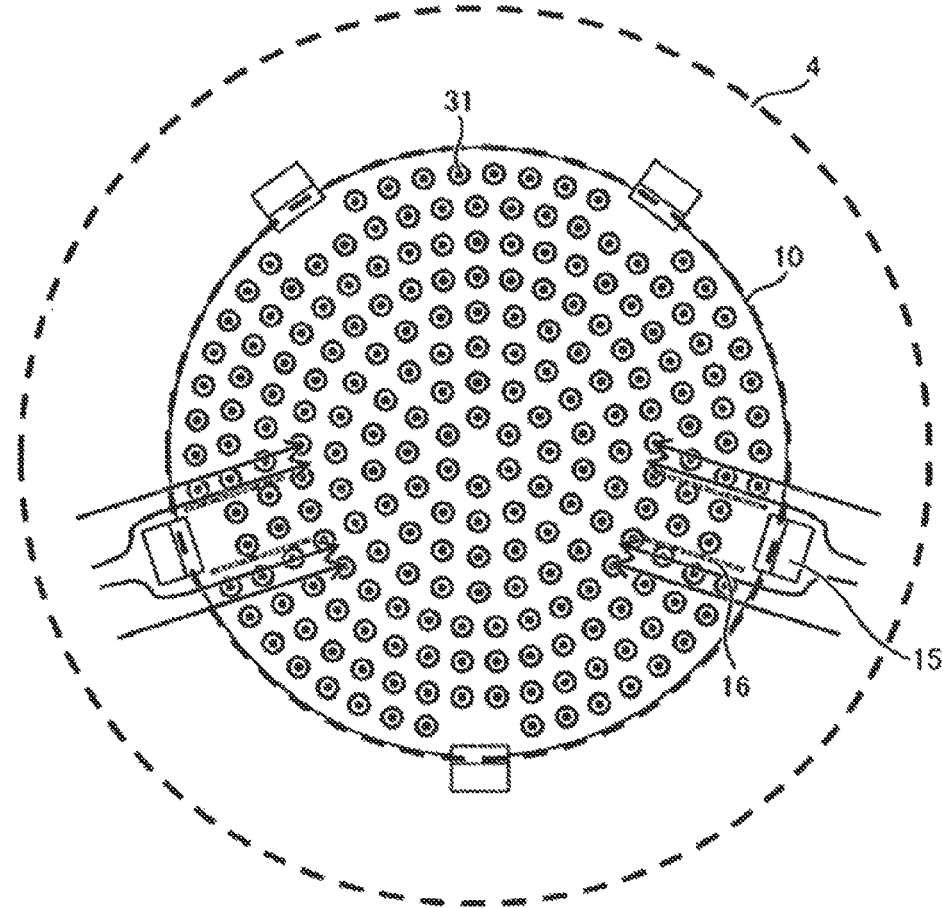
FIG. 7A is a sectional view, taken along section lines A-A' in FIG. 2, of fueling nozzles which form part of a burner equipped in a gas turbine combustor of a second embodiment of the present invention.

FIG. 7A snows the same cross section as section A-A' of FIG. 2 relating to the first embodiment of the present invention, FIG. 7A being a sectional view of the corresponding region as extracted for the second embodiment. In the present embodiment, two porous plates 16 are disposed in a direction parallel to a flow of combustion air.

Figure 7B:
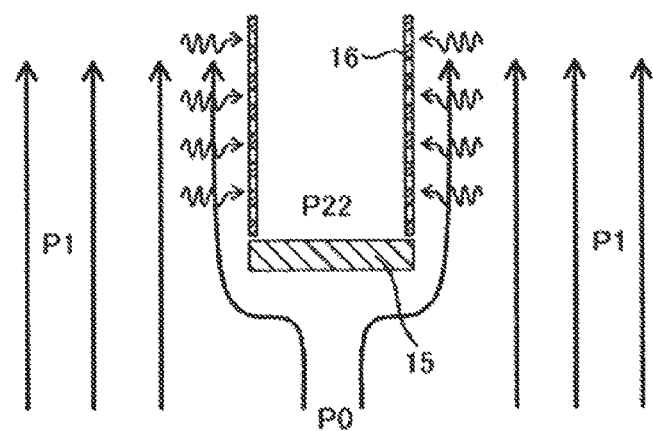
FIG. 7B is an enlarged view of a support region which forms part of the burner equipped in the gas turbine combustor of the second embodiment.

The flow of combustion air around the supports 15 disposed at the same phase positions as those of the cross fire tubes is shown in a schematic diagram of FIG. 7B. A basic flow of combustion air is substantially the same as in the first embodiment of the present invention. Since the flow of combustion air is obstructed by the porous plates 16, however, the combustion air is not supplied to the downstream side of the supports 15 as smoothly as in the first embodiment. That is to say, pressure P22 at the same position as that of pressure P21 in the first embodiment is lower than P21 (i.e., P21>P22), so the amount of combustion air supplied from the burner center to the burner between the cross fire tubes decreases below that obtained in the first embodiment, and the fuel/air ratio can therefore be further enhanced. The present embodiment is particularly effective for further reducing the amount of combustion air with respect to the combustion air flow reduction effect in the first embodiment.

In accordance with the present embodiment, therefore, during the ignition of the gas turbine equipped with a plurality of combustors, all combustor cans are ignited at a suitable fuel flow rate. In addition, during full-speed turbine operation, for the same reason as that described in the first embodiment, an acceleration loss occurring at the upstream, side of a flame makes substantially nil a local, combustion-air reduction effect of the supports 15 and the porous plates 16. Both low-NOx combustion and stable combustion are therefore achieved at the same time during fall-speed turbine operation.

(3) Third Embodiment

Next, a gas turbine combustor installed in a gas turbine according to a third embodiment of the present invention, and a method of operating the combustor are described below with reference to FIG. 8.

The gas turbine combustor installed in the gas turbine of the present embodiment is basically of the same configuration as that of the gas turbine combustor installed in the gas turbine according to the first embodiment of the present invention, shown in FIGS. 1 to 6. Description of configurational and operational factors common to both embodiments is therefore omitted hereinafter and only differences between both are described below.

Figure 8:
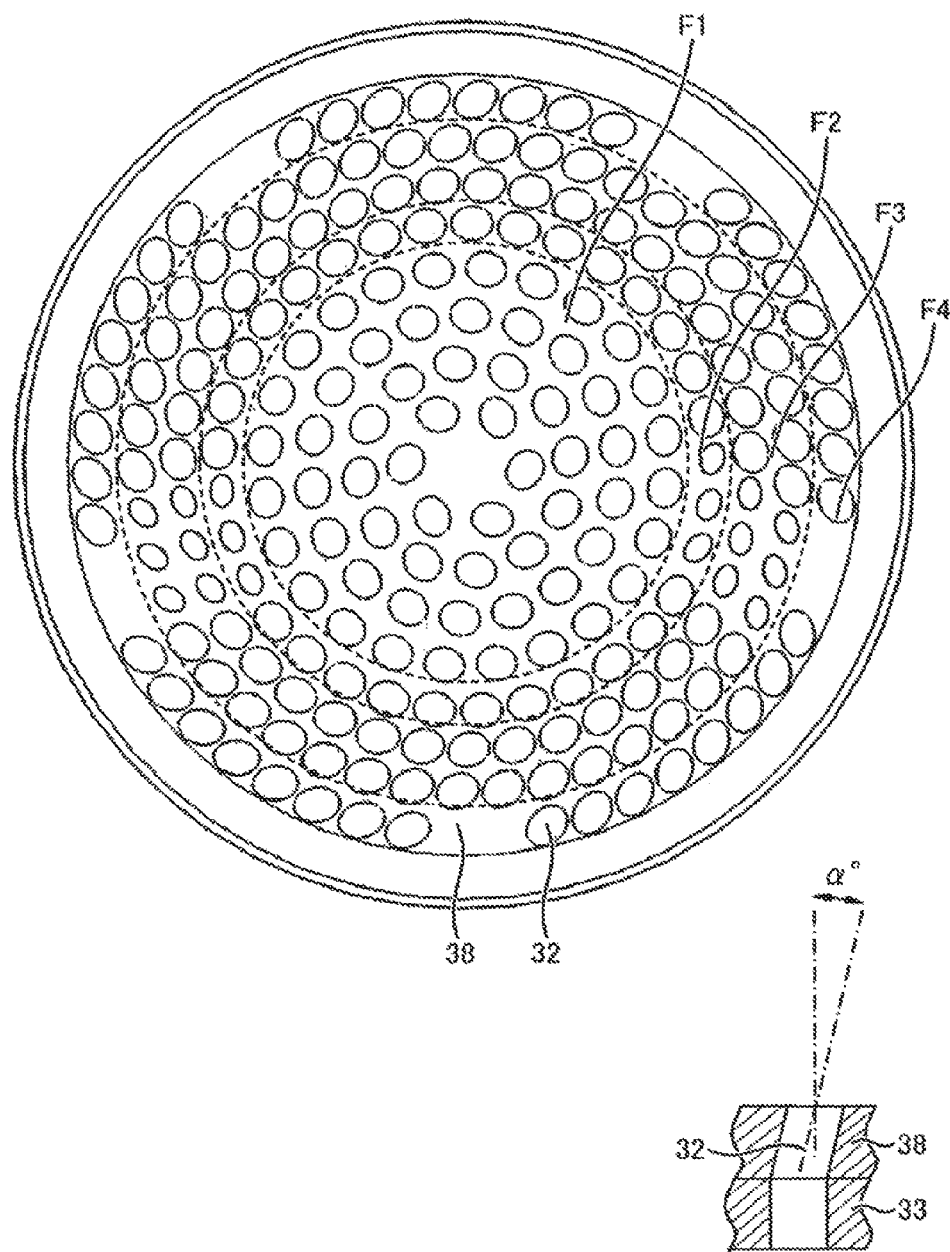
FIG. 8 is a schematic view of a swirling plate which forms part of a burner equipped in a gas turbine combustor of a third embodiment.

FIG. 8, which shows the air injection hole plate mounted in the gas turbine combustor 2 of the present embodiment, is a structural view of the air injection hole plate as viewed from the downstream side of the combustor. In the gas turbine combustor 2 of the present embodiment, a large number of air injection holes 32 (and although not shown, fueling nozzles 31 paired with the air injection holes 32) are arranged in eight annular rows concentrically from the radial inner edge of the air injection hole plate to the radial outer edge thereof. The present embodiment differs from the first embodiment in that the air injection holes in a region near the cross fire tubes in the fifth to seventh rows have a diameter smaller than that of the air injection holes existing in other regions. The reduction in the diameter of the former air injection holes allows reduction in the amount of combustion air supplied to the corresponding region. This makes the present, embodiment particularly effective for improving flame propagation performance by further reducing the amount of combustion air.

In accordance with the present embodiment, therefore, during the ignition of the gas turbine equipped with a plurality of combustors, all combustor cans are ignited at a suitable fuel flow rate, and during full-speed turbine operation, low-NOx combustion and stable combustion are both achieved at the same time.

(4) Fourth Embodiment

Next, a gas turbine combustor installed in a gas turbine according to a fourth embodiment of the present invention, and a method of operating the combustor are described below with reference to FIGS. 9A and 9B.

The gas turbine combustor installed in the gas turbine of the present embodiment is basically of the same configuration as that of the gas turbine combustor installed in the gas turbine according to the first embodiment of the present invention, shown in FIGS. 1 to 6. Description of configurational and operational factors common to both embodiments is therefore omitted hereinafter and only differences between both are described below.

Figure 9A:
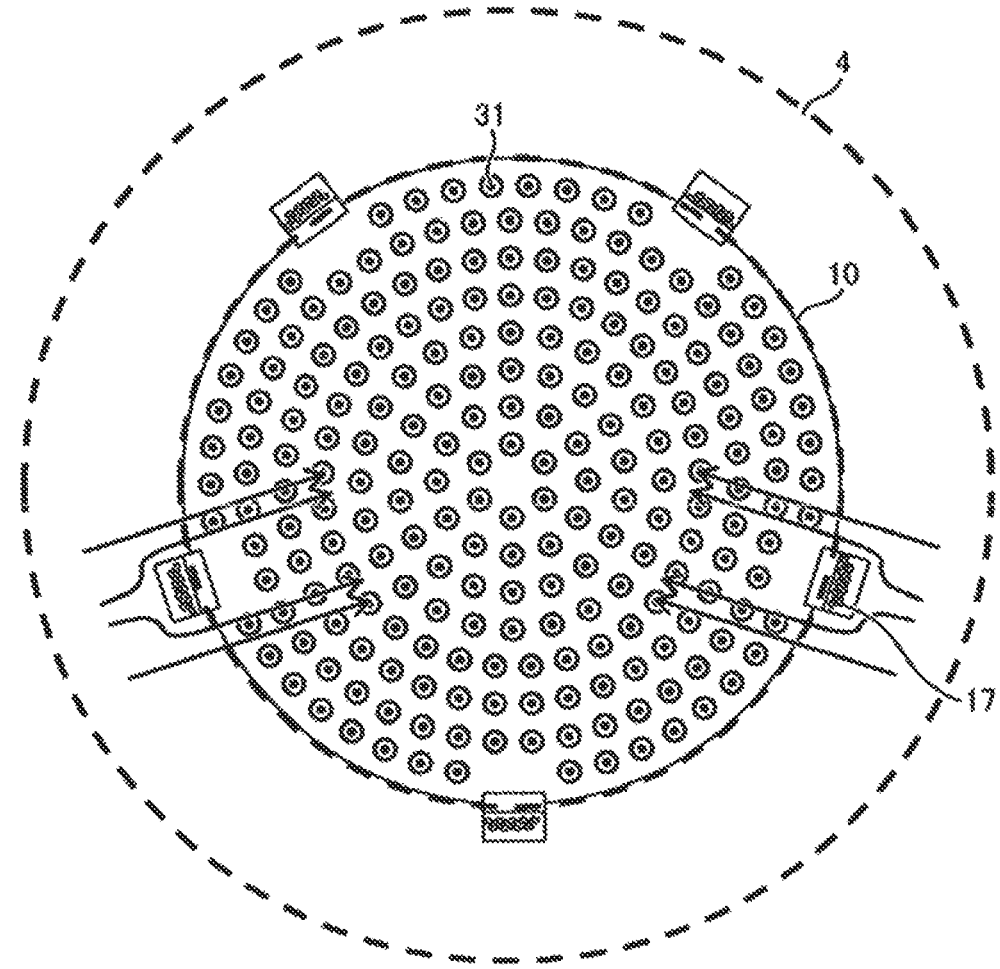
FIG. 9A in is a sectional view, taken along section lines A-A' in FIG. 2, of fueling nozzles which form part of a burner equipped in a gas turbine combustor according to a fourth embodiment of the present invention.

FIG. 9A shows the same cross section as section A-A' of FIG. 2 relating to the first embodiment of the present invention, FIG. 9A being a sectional view of the corresponding region as extracted for the fourth embodiment. A number of holes are formed in the supports 15 to make these supports function as porous plate supports 17.

Figure 9B:
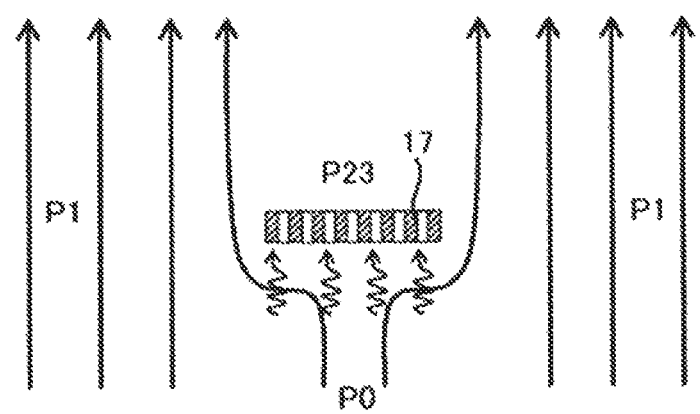
FIG. 9B is an enlarged view of a support region which forms part of the burner equipped in the gas turbine combustor according to the fourth embodiment of the present invention.

The flow of combustion air around the porous plate supports 17 disposed at the same phase positions as those of the cross fire tubes is shown in a schematic diagram of FIG. 9B. A basic flow of combustion air is substantially the same as in the first embodiment of the present invention. However, the combustion air is supplied more smoothly than in the first embodiment. That is to say, pressure P23 at the same position as that of pressure P21 in the first embodiment is higher than P21 (i.e., P21<P23), so the amount of combustion air supplied from the burner center to the burner between the cross fire tubes increases above that obtained in the first embodiment, and the enhancement of the fuel/air ratio can therefore be suppressed. The present embodiment is particularly effective for suppressing the combustion air flow reduction effect of the first embodiment. The present embodiment is also effective for improving gas turbine efficiency, since a pressure loss due to use of supports is reduced relative to that encountered, in the first embodiment.

In accordance with the present embodiment, therefore, during the ignition of the gas turbine equipped with a plurality of combustors, all combustor cans are ignited at a suitable fuel flow rate, and during full-speed turbine operation, low-NOx combustion and stable combustion are both achieved at the same time.

An example in which supports and the like are disposed at the same phase positions as those of cross fire tubes has been taken in each of the embodiments described above. The phase position of the supports and the like, however, does not always need to be completely matched to the phase position of the cross fire tubes and may be made appropriately adjustable according to width of the supports, a swirling angle of the air injection holes, and/or other parameters. Briefly, the phase position of the supports and that of the cross fire tubes need only to be nearly matched in a range that the advantageous effects described in the above embodiments can be obtained.

What is claimed is:

1. A gas turbine combustor comprising:
 a combustion chamber that burns a fuel and air to generate combustion gases;
 a fuel header with a plurality of fueling nozzles disposed thereupon to inject the fuel;
 an air injection hole plate with a plurality of air injection holes formed therein to deliver to the combustion chamber the air along with the fuel injected from the fueling nozzles;
 cross fire tubes that each transport the combustion gases to an adjacent combustor and ignite the adjacent combustor during gas turbine ignition; and
 supports for fixing the air injection hole plate to the fuel header,
 wherein the supports are provided so as to be at the same phase position as that of the cross fire tubes,
 wherein the supports have a width greater than an inside diameter of the cross fire tubes adapted for obstructing air flowing into the air injection hole plate such that a fuel/air ratio is increased downstream the supports and at the same phase position of the cross fire tubes.

2. The gas turbine combustor according to claim 1, further comprising:
 a firing burner that supplies and burns the fuel during gas turbine ignition; and
 a non-firing burner inactivated during gas turbine ignition; wherein:
 part of the non-firing burner is formed by a row of the air injection holes annularly arranged around an outer circumference of the firing burner; and
 at the same phase position as that in which the cross fire tubes are disposed, the non-firing burner has a region particularly large in hole pitch between adjacent air injection holes arranged in the row of the air injection holes that forms part of the non-firing burner.

3. The gas turbine combustor according to claim 1, further comprising porous plates placed downstream of the supports so as to extend in a direction parallel to a flow of air moving from an outer circumferential side of the air injection hole plate, towards an inner circumferential side thereof.

4. The gas turbine combustor according to claim 1, wherein a plurality of air injection holes arranged at the same phase position as that of the cross fire tubes have a diameter smaller than that of the other air injection holes.

5. The gas turbine combustor according to claim 1, wherein the supports are porous plates.

6. A method for operating a gas turbine combustor comprising a combustion chamber that burns a fuel and air to generate combustion gases, a fuel header with a plurality of fueling nozzles disposed thereupon to inject the fuel, an air injection hole plate with a plurality of air injection holes formed therein to deliver to the combustion chamber the air along with the fuel injected from the fueling nozzles, cross fire tubes that each transport the combustion gases to an adjacent combustor and ignite the adjacent combustor during gas turbine ignition, and supports for fixing the air injection hole plate to the fuel header, the supports being provided so as to be at a same phase position as that of the cross fire tubes, the supports having a width greater than an inside diameter of the cross fire tubes, the method comprising:
- supplying the combustion gases generated in the combustion chamber to an adjacent combustor via the cross fire tubes provided at the same phase position as that of the supports; and
- obstructing air flowing through the supports into the air injection hole plate such that a fuel/air ratio is increased downstream the supports and at the same phase position of the cross fire tubes.

* * * * *